US009720191B2

(12) United States Patent
Huang et al.

(10) Patent No.: US 9,720,191 B2
(45) Date of Patent: Aug. 1, 2017

(54) OPTICAL TRANSCEIVER MODULE AND OPTICAL CABLE MODULE

(71) Applicant: USENLIGHT CORP., Zhubei (TW)

(72) Inventors: Yun-Cheng Huang, Zhubei (TW);
Takashi Mogi, Zhubei (TW);
Toshikazu Uchida, Zhubei (TW);
Chang-Cherng Wu, Zhubei (TW)

(73) Assignee: USENLIGHT CORP., Zhubei (TW)

( * ) Notice: Subject to any disclaimer, the term of this patent is extended or adjusted under 35 U.S.C. 154(b) by 0 days.

(21) Appl. No.: 15/143,644

(22) Filed: May 2, 2016

(65) Prior Publication Data
US 2017/0059796 A1   Mar. 2, 2017

(30) Foreign Application Priority Data

Aug. 28, 2015  (CN) .......................... 2015 1 0537575

(51) Int. Cl.
*G02B 6/43*   (2006.01)
*G02B 6/42*   (2006.01)
*H04B 10/40*   (2013.01)

(52) U.S. Cl.
CPC ........... *G02B 6/4251* (2013.01); *G02B 6/424* (2013.01); *G02B 6/4246* (2013.01); *G02B 6/4257* (2013.01); *G02B 6/4281* (2013.01); *G02B 6/4292* (2013.01); *G02B 6/43* (2013.01); *H04B 10/40* (2013.01)

(58) Field of Classification Search
None
See application file for complete search history.

(56) References Cited

U.S. PATENT DOCUMENTS

| 5,093,879 | A | * | 3/1992 | Bregman | G02B 6/4249 250/227.11 |
| 5,177,806 | A | * | 1/1993 | Abbott | G02B 6/3835 385/138 |
| 6,388,264 | B1 | * | 5/2002 | Pace | H01L 25/167 250/239 |
| 6,502,999 | B1 | * | 1/2003 | Cohen | G02B 6/4246 385/147 |
| 6,804,431 | B2 | * | 10/2004 | Kowalkowski | G02B 6/4292 385/147 |
| 7,003,192 | B2 | * | 2/2006 | Blair | G02B 6/3582 385/17 |
| 9,400,359 | B1 | * | 7/2016 | Fu | G02B 6/4244 |
| 2003/0053784 | A1 | * | 3/2003 | LaBrake | C03C 17/22 385/128 |
| 2004/0086240 | A1 | * | 5/2004 | Togami | G02B 6/4246 385/92 |

(Continued)

*Primary Examiner* — Mike Stahl
(74) *Attorney, Agent, or Firm* — Mark M. Friedman

(57) ABSTRACT

An optical transceiver module and an optical cable module are disclosed. The optical cable module comprises an optical cable and the optical transceiver module connected to the optical cable. The optical transceiver module comprises a substrate, at least one optical receiving device and a plurality of hermetic transmitting devices. The plurality of hermetic transmitting devices are disposed on the substrate, wherein each of the hermetic transmitting devices includes an optical transmitter, and the optical transmitters of the hermetic transmitting devices are completely sealed in one or more than one hermetic housing.

18 Claims, 14 Drawing Sheets

(56) References Cited

U.S. PATENT DOCUMENTS

| | | | |
|---|---|---|---|
| 2005/0007741 A1* | 1/2005 | Ice | G02B 6/4201 |
| | | | 361/704 |
| 2005/0168957 A1* | 8/2005 | Kawauch | G02B 6/4246 |
| | | | 361/749 |
| 2007/0058911 A1* | 3/2007 | Yu | G02B 6/4292 |
| | | | 385/92 |

* cited by examiner

OPTICAL TRANSCEIVER MODULE AND OPTICAL CABLE MODULE

BACKGROUND OF THE INVENTION

Field of Invention

The present invention relates to an optical transceiver module and an optical cable module, and more particularly to a compact optical module having a high-density packaging.

Description of Prior Art

At present, the demand for computing devices continues to rise, even as the demand for computing devices to achieve higher performance also rises. However, conventional electrical I/O (input/output) signaling is not expected to keep pace with the demand for performance increases, especially for future high performance computing expectations. Currently, I/O signals are sent electrically to and from the processor through the board and out to peripheral devices. Electrical signals must pass through solder joints, cables, and other electrical conductors. Therefore, electrical I/O signal rates are limited by the electrical characteristics of the electrical connectors.

The optical fiber transmission system replaces the traditional communication transmission system gradually. The optical fiber transmission system does not have bandwidth limitation, and also has advantages of high speed transmission, long transmission distance, its material not interfered by the electromagnetic wave. Therefore, present electronic industrial performs research toward optical fiber transmission which will become the mainstream in the future.

While the use of optical interconnections is finding increasing use in computing devices, currently the components used for optical signaling require special processing that increases the cost and complexity of system manufacturing. For example, in recent years, the optical modules such as optical transceiver are required to be further downsized. However, due to a decreased area of a substrate, a high-density packaging of components becomes difficult.

SUMMARY OF THE INVENTION

An object of the present invention is to provide an optical transceiver module comprising a substrate, at least one optical receiving device, and a plurality of hermetic transmitting devices. The substrate has a first surface and a second surface opposite thereto. The at least one optical receiving device is connected to the substrate. The plurality of hermetic transmitting devices are disposed on the substrate, wherein each of the hermetic transmitting devices includes an optical transmitter, and the optical transmitters of the hermetic transmitting devices are completely sealed in one or more than one hermetic housing.

Another object of the present invention is to provide an optical cable module comprising an optical cable and an optical transceiver module connected to the optical cable, wherein the optical transceiver module comprises a substrate, at least one optical receiving device, and a plurality of hermetic transmitting devices. The substrate has a first surface and a second surface opposite thereto. The at least one optical receiving device is connected to the substrate. The plurality of hermetic transmitting devices are disposed on the substrate, wherein each of the hermetic transmitting devices includes an optical transmitter, and the optical transmitters of the hermetic transmitting devices are completely sealed in one or more than one hermetic housing.

In various embodiments of the present invention, the plurality of hermetic transmitting devices can be arranged on the first surface of the substrate. In one embodiment, 4 or more than 4 hermetic transmitting devices can arranged on the first surface in parallel.

In various embodiments of the present invention, the optical transceiver module can further comprise a positioning holder configured to position and hold the plurality of hermetic transmitting devices on the first surface of the substrate, so as to secure the connections between the fibers and the transceiver devices (transmitter/receiver), thereby enhancing the reliability of the optical transceiver module.

In various embodiments of present invention, the positioning holder can be disposed on the first surface of the substrate, and the positioning holder can include a plurality of recesses and at least one groove. The plurality of recesses are configured to correspondingly receive and position the plurality of hermetic transmitting devices, and the groove is configured to engage the hermetic transmitting devices on the positioning holder.

In various embodiments of the present invention, each of the hermetic transmitting devices comprises an optical transmitter, and the optical transmitter is completely sealed and packaged in one or more than one hermetic housing. That is, the optical transmitter sealed in the hermetic transmitting devices will not be exposed to the outside environment or air, thereby preventing the optical transmitter from degradation, as well as enhancing a performance and a life time of the optical transmitter.

In various embodiments of the present invention, an air-tightness of the hermetic transmitting devices at least satisfies the requirement of the air-tightness of an industrial transmitter optical sub-assembly (TOSA).

In various embodiments of the present invention, the airtightness of each of the hermetic transmitting devices may be in the range of $1\times10^{-12}$ to $5*10^{-7}$ (atm*cc/sec). In some embodiments, more specifically, the airtightness of the hermetic transmitting devices may be in the range of $1\times10^{-9}$ to $5*10^{-8}$ (atm*cc/sec).

In various embodiments of the present invention, each of the hermetic transmitting devices may further include one or more than one hermetic housing and a cylindrical element. The optical transmitter can be sealed and packaged within the hermetic housing without any gap or slit, so as to enhance the air-tightness of the hermetic transmitting devices.

In various embodiments of the present invention, the cylindrical elements of the hermetic transmitting devices are disposed at one side of hermetic housing and partially received in the recesses of the positioning holder, and the optical signals emitted from the optical transmitters can be transmitted to the fibers through the cylindrical elements. At least one outer ring part is formed on the outer surface of the cylindrical elements for engaging the groove of the positioning holder.

In various embodiments of the present invention, the hermetic transmitting devices can further comprise at least one fiber position spring and a spring holder. The at least one fiber position spring is disposed at one side of the cylindrical elements and secured in the spring holder. The external optical fibers can be inserted through the fiber position spring for being connected to the cylindrical elements. In this manner, external optical fibers can be securely connected to the cylindrical elements by the fiber position spring. More specifically, one part of the spring holder close to the fibers is movable and connect to the fiber position spring.

In various embodiments of the present invention, at least one protruded portion of the cylindrical elements can protrude beyond or exceed one end or one side of the substrate, and the at least one optical receiving device can be positioned or mounted at one side of the protruded portion of the cylindrical elements, such as mounted to the bottom of the protruded portion of the cylindrical elements. In this case, at least one portion of the positioning holder can protrude beyond or exceed one end or one side of the substrate, so as to securely hold the protruded portion of the cylindrical elements.

In various embodiments of the present invention, the at least one optical receiving device may be non-hermetic and mounted below the protruded portion of the cylindrical elements and the spring holder by a chip-on-board manner. In this case, the hermetic transmitting devices can be arranged on the first surface of the substrate, and the at least one optical receiving device 114 can be mounted below the cylindrical elements, without being mounted on the first surface 111a of the substrate. Therefore, the size or width of the substrate of the optical transceiver module can be reduced. That is, the optical receiving device can be directly mounted on the protruded portion of the cylindrical elements, without being mounted on the second surface of the substrate.

In one embodiment, a flexible printed circuit (FPC) board is connected between the optical receiving device and a circuit of the substrate, and the optical receiving device can be electrically connected to the circuit of the substrate through the FPC board.

In one embodiment, the at least one optical receiving device may be hermetic type receiver. In another embodiment, the at least one optical receiving device may be mounted on the second surface of the substrate by the chip-on-board manner.

In varied embodiments, the size of each of the plurality of hermetic transmitting devices can satisfy a design requirement of QSFP28, QSFP+, or Micro QSFP+. For example, in one embodiment, the width of the substrate may be in the range of 11 mm to 18 mm. Moreover, in another embodiment, the width of the substrate 111 may be in the range of 11.5 mm to 17 mm. For example, in one embodiment, the length of the substrate 111 may be in the range of 58 mm to 73 mm. Moreover, in another embodiment, the length of the substrate may be in the range of 63 mm to 73 mm. In this manner, the size of each of the plurality of hermetic transmitting devices can satisfy the requirement of QSFP28, QSFP+, or Micro QSFP+.

In one embodiment, the width of the module housing may be in the range of 13 mm to 20 mm. Moreover, in another embodiment, the width of the module housing may be in the range of 13.5 mm to 19 mm. For example, in one embodiment, the length of the module housing 116 may be in the range of 60 mm to 75 mm. Moreover, in another embodiment, the length of the module housing 116 may be in the range of 65 mm to 75 mm. In this manner, the optical transceiver module of the present invention can be downsized.

In various embodiments of the present invention, the plurality of optical transmitters of the plurality of hermetic transmitting devices can be packaged and assembled in one single hermetic housing.

In one embodiment, the single hermetic housing can be an L-shaped housing with a recess, and the optical fiber can pass through the recess to be connected to the optical receiving device. More specifically, in this embodiment, the hermetic transmitting devices can be disposed at one end of the substrate, and at least one portion of the optical receiving device can be received in the recess of the L-shaped housing. In this manner, the plurality of hermetic transmitting devices and the at least one optical receiving device can be assembled packaged within a small optical transceiver module for down-sizing the optical transceiver.

In some embodiments, the plurality of hermetic transmitting devices may have an L-shaped arrangement, and the optical fiber can pass through the L-shaped arrangement of the plurality of hermetic transmitting devices to be connected to the optical receiving device.

In one embodiment, the substrate can have a substrate recess, thereby being L-shaped. In this embodiment, at least one of the hermetic transmitting devices can be disposed and positioned in the substrate recess of the substrate, and electrically connected to a circuit on the second surface of the substrate for being electrically connected to the processor.

In one embodiment, at least one of the hermetic transmitting devices, such as two of the hermetic transmitting devices, can be disposed and positioned in the substrate recess, and the other hermetic transmitting devices, such as two of the hermetic transmitting devices, can be disposed on the first surface of the substrate, and the optical receiving device can be disposed on the first surface of the substrate and positioned at one side of the substrate recess. In this manner, the plurality of hermetic transmitting devices and the at least one optical receiving device can be assembled packaged within a small optical transceiver module for down-sizing the optical transceiver.

In varied embodiments, the optical receiving device can include a receiver housing and the optical receiving chip, and the optical receiving chip is disposed in the receiver housing. The optical receiving chip can include a chip substrate, an optical receiver (or photo-detector) and at least one position hole. The chip substrate has a first substrate surface and a second substrate surface, and the optical receiver can be disposed on the first substrate surface of the chip substrate, and a circuit can be formed on the first substrate surface to be connected to the optical receiver. The at least one position hole can be formed on the second substrate surface of the chip substrate, and further positioned to the optical receiver on the first substrate surface.

In varied embodiments, the largest diameter (or width) W of the position hole can be larger than a diameter of one end of the external optical fiber, and thus a signal output end of the external optical fiber can be inserted into and received in the position hole.

In varied embodiments, a distance between a bottom surface within the position hole and the optical receiver on the first substrate surface can be in a range of 40 micrometers (μm) to 90 μm.

In one embodiment, an angle θ between an end surface of the signal output end of the optical fiber and an axis direction of the fiber core can be less than 90 degrees, so as to reduce the undesired light reflection when emitting optical signals to the optical receiver on the first substrate surface, in this case, the angle θ may be in a range of 80 agrees to 85 agrees.

In one embodiment, a lens component can be disposed at the signal output end of the optical fiber for improving the output efficiency of the outputted signals from the optical fiber. For example, when the signal output end of the optical fiber is inserted and received in the position hole, the optical signals emitted from the optical fiber can be focused on the optical receiver on the first substrate surface, thereby improving the output efficiency of the outputted signals from the optical fiber.

In one embodiment, the lens component disposed at the signal output end of the optical fiber may be a convexo-plane lens or a graded-index (GRIN) lens for focusing the optical signals emitted from the optical fiber onto the optical receiver.

In varied embodiments, the optical receiving chip can further include an optical adhesive filled between the optical fiber and the position hole for securing the optical fiber in the position hole. In one embodiment, a refractive index of the optical adhesive can match a refractive index of the chip substrate and a refractive index of the optical fiber, so as to reduce the undesired light reflection or refraction when emitting optical signals to the optical receiver. That is, the refractive index of the optical adhesive can be in a range of the refractive index of the chip substrate to the refractive index of the optical fiber, so as to reduce the undesired light reflection or refraction.

In one embodiment, the refractive index of the optical adhesive can be in a range of 1.2 to 3.5, so as to reduce the undesired light reflection or refraction. In another one embodiment, the refractive index of the optical adhesive can be in a range of 1.5 to 3.3, so as to reduce the undesired light reflection or refraction.

In one embodiment, a convexity can be formed on the bottom surface within the position hole. The convexity is positioned to the signal output end of the optical fiber for acting as a concave lens, so as to focus the optical signals emitted from the optical fiber onto the optical receiver.

In one embodiment, the optical receiving chip includes a chip substrate, a plurality of optical receivers (or photodetectors) and a plurality of position holes. The plurality of optical receivers are disposed on the first substrate surface of the chip substrate, thereby forming an array of the plurality of optical receivers. The plurality of position holes are formed on the second substrate surface of the chip substrate, and further positioned to the optical receivers on the first substrate surface of the chip substrate, respectively. The signal output ends of the plurality of external optical fibers can be inserted into and received in the position holes, respectively.

In comparison with the conventional optical cable, with the use of the power line integrated into the optical cable, the optical cable can directly supply the power to electronic device without connecting to an external power source. Moreover, the optical cable module of the present invention can indicate the using status thereof, and the optical cable of the optical cable module can have varied colors for promoting the appearance thereof, thereby being suitable for consumer electronic products.

In addition, with the reflection of the power line, the visible light passing through the transparent portion can be more prominent, and the visibility and appearance of the optical cable can be improved. In addition, the visible light penetrating through the transparent portion can be used to visibly remind or warn the user of the existence of the optical cable, especially in a dark room. Moreover, with the mechanical strength of the power line, the structure of the optical cable can be reinforced. In this manner, even a width or a diameter of the optical cable is reduced, the optical cable still can have an allowable mechanical strength, thereby being suitable for consumer electronic products.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

Figure 1:
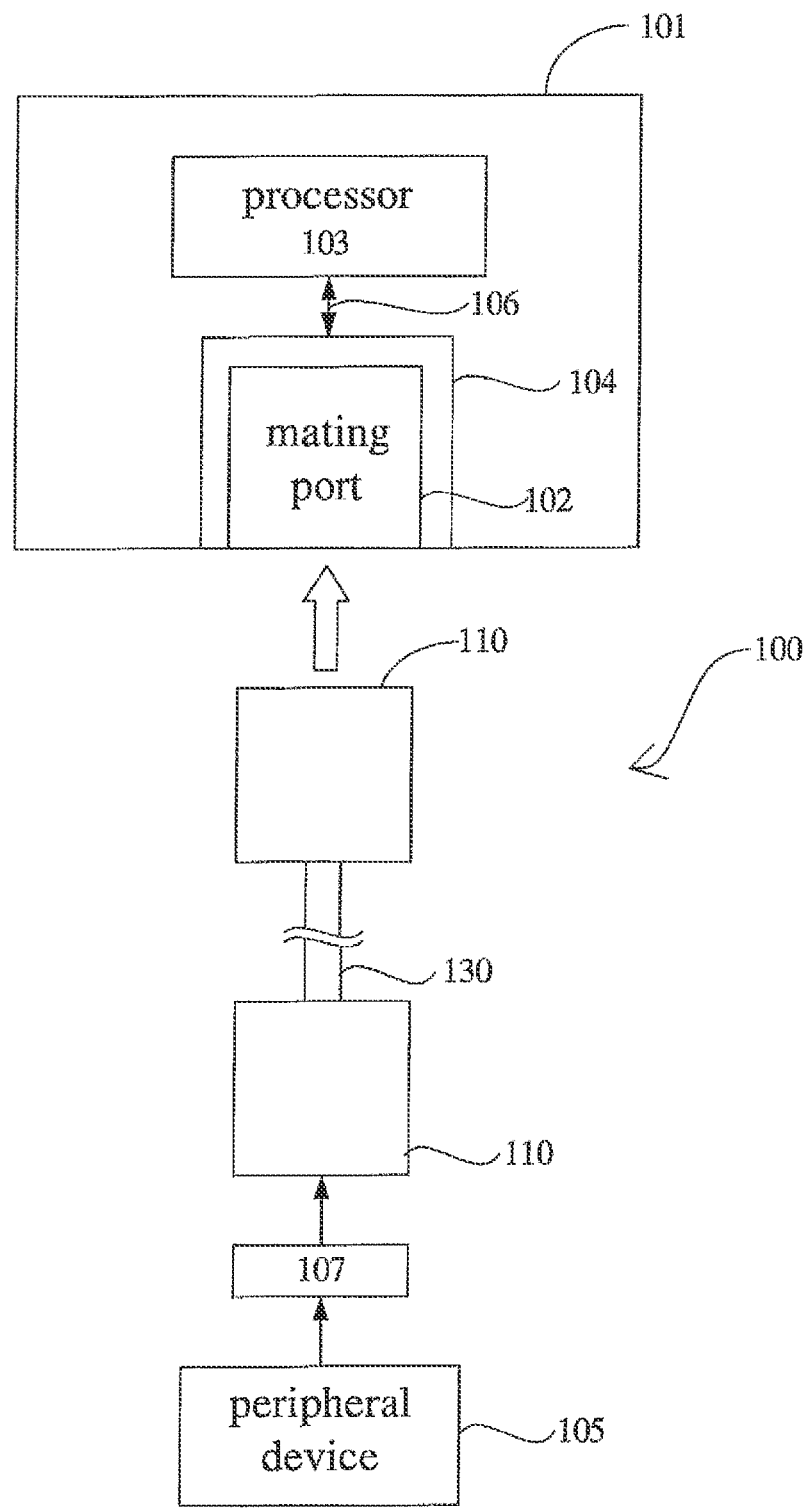
FIG. 1 is a block diagram showing a system using the optical cable module according to one embodiment of the present invention.
Figure 2:
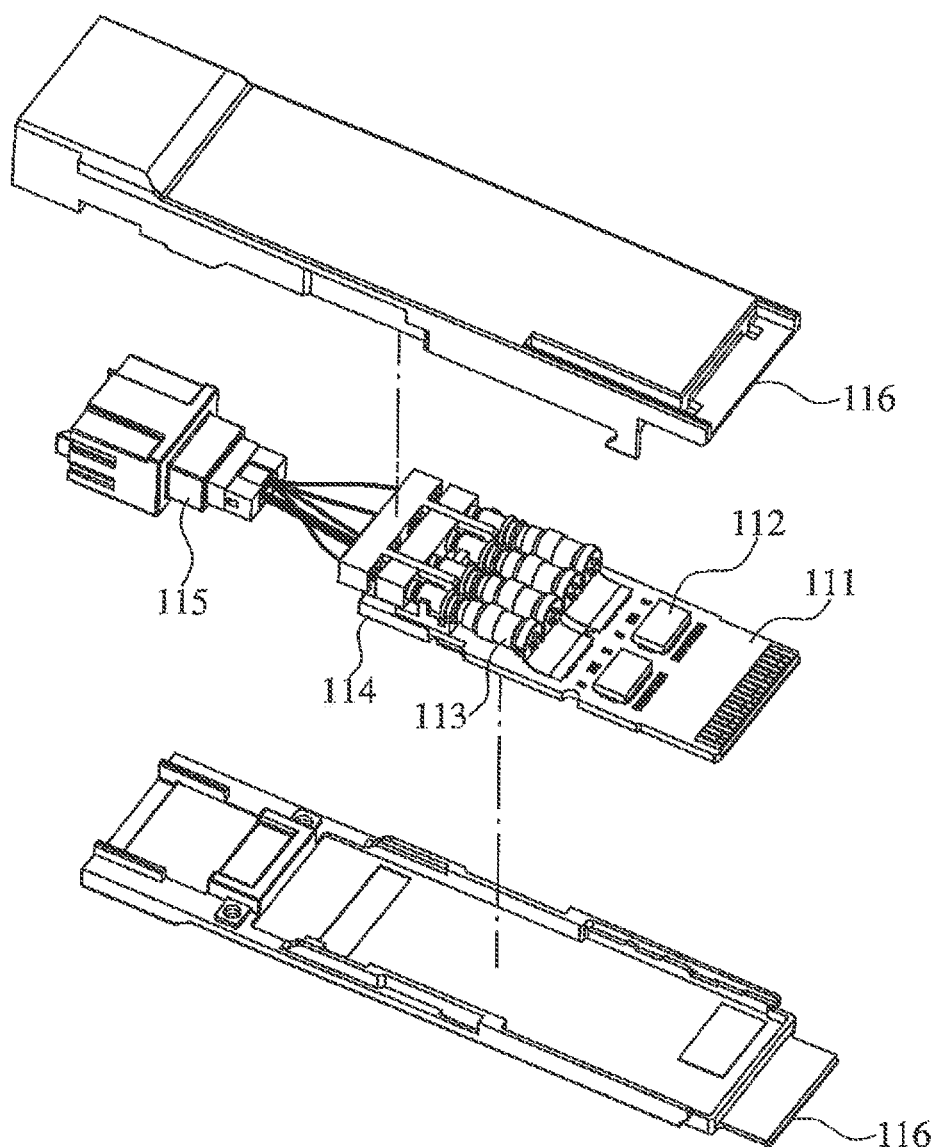
FIGS. 2 to 5 are schematic diagrams showing the optical transceiver module according to one embodiment of the present invention.
Figure 3:
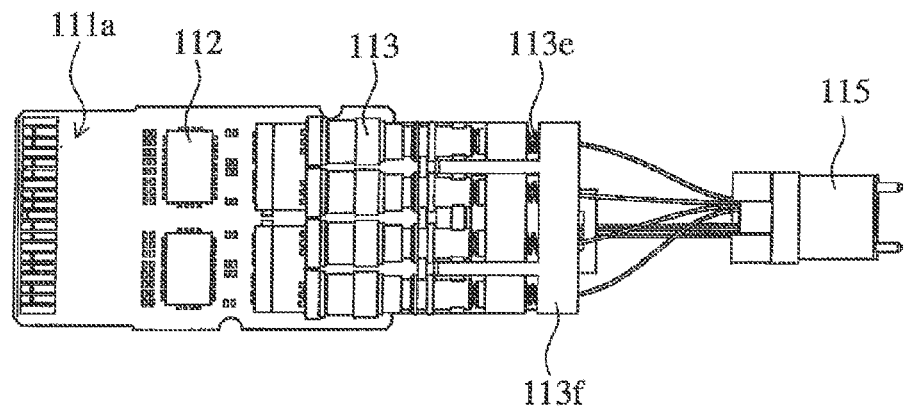
Figure 4:
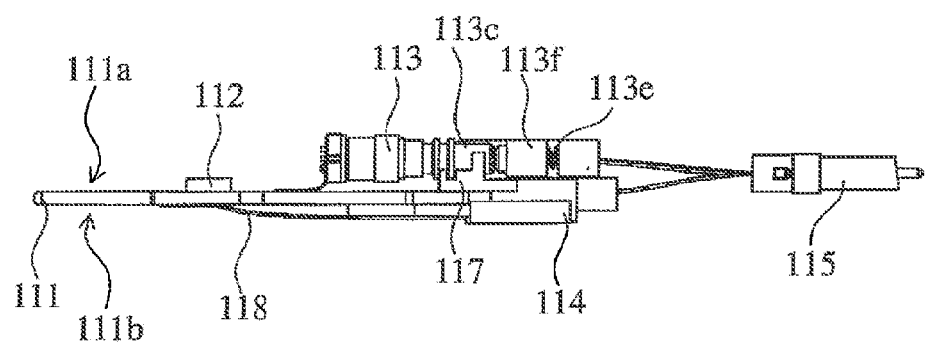

The following embodiments are referring to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings allow ease of understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It should be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top with respect to the direction of gravitational pull.

FIG. 1 is a block diagram showing a system using the optical cable module 100 according to one embodiment of the present invention. The optical cable module 100 of present embodiment comprises an optical transceiver module 110 and an optical cable 130 for transmitting signals, such as video or data signals, to an electronic device 101. The electronic device 101 may be any of a number of computing devices, including, but not limited to, a desktop or laptop computer, a notebook, a tablet, a netbook, an Ultrabook, or other such computing devices. Besides computing devices, it should be understood that many other types of electronic devices may incorporate one or more of the types of the optical transceiver module 110 and/or mating port 102 herein, and the embodiments described herein would apply equally well in such electronic devices. Examples of other such electronic devices may include handheld devices, smart-phones, media devices, ultra-mobile personal computers, personal digital assistants (PDA), mobile phones, multimedia devices, memory devices, cameras, voice recorders, I/O devices, servers, set-top boxes, printers, scanners, monitors, televisions, electronic billboards, projectors, entertainment control units, portable music players, digital video recorders, networking devices, gaming devices, gaming consoles, or any other electronic device that might include such a optical transceiver module 110 and/or mating port 102. In some embodiments, the electronic device 101 may be any other electronic device that processes data or images.

Referring to FIG. 1 again, the optical cable 130 is connected to the optical transceiver module 110 for transmitting optical signals. The optical cable 130 may includes one or more than one optical fiber, and the optical signals are transmitted within the optical fiber.

Referring to FIG. 1 again, the electronic device 101 can comprise a processor 103, and the processor 103 can be any processing component that processes electrical and/or optical I/O signals. It should be understood that a single processing device could be used, or multiple separate devices may be used. The processor 103 may include or be a microprocessor, programmable logic device or array, microcontroller, signal processor, or any combination thereof. Furthermore, the processor 103 may include any type of processing unit, such as, for example, CPU, multi-processing unit, a reduced instruction set computer (RISC), a processor that has a pipeline, a complex instruction set computer (CISC), digital signal processor (DSP), and the like.

Referring to FIG. 1 again, the mating port 102 of the electronic device 101 is configured to interface with the optical transceiver module 110 of the optical cable module 100. The optical transceiver module 110 is configured to allow a peripheral device 105 to interconnect with the electronic device 101. The optical transceiver module 110 may support communication via an optical interface. In various embodiments, the optical transceiver module 110 may also support communication via an electrical interface.

Referring to FIG. 1 again, the peripheral device 105 may be a peripheral 110 device. In various embodiments, the peripheral device 105 may be any of a number of computing devices, including, but not limited to, a desktop or laptop computer, a notebook, an Ultrabook, a tablet, a netbook, or other such computing devices. Besides computing devices, it should be understood that the peripheral device 105 may include handheld devices, smartphones, media devices, personal digital assistants (PDA), ultra-mobile personal computers, mobile phones, multimedia devices, memory devices, cameras, voice recorders, I/O devices, servers, set-top boxes, printers, scanners, monitors, televisions, electronic billboards, projectors, entertainment control units, portable music players, digital video recorders, networking devices, gaming devices, gaming consoles, or any other electronic device.

In one embodiment, the electronic device 101 may include an internal optical path, and the optical path may represent one or more components, which can include processing and/or termination components that convey an optical signal between processor 103 and port 102. Conveying a signal can include the generation and converting to optical, or the receiving and converting to electrical, as described in more detail below. In an embodiment where electrical interfacing from port 102 is supported in device 101, device 101 may also include an electrical path, and the electrical path represents one or more components that convey an electrical signal between processor 103 and port 102.

Referring to FIG. 1 again, the optical transceiver module 110 of the present invention is configured to mate with the mating port 102 of the electronic device 101. As used herein, mating one connector with another may refer to providing a mechanical connection. The mating of one connector with another typically also provides a communication connection. The mating port 102 may include a housing 104, which may provide the mechanical connection mechanisms. The mating port 102 may also include one or more optical interface components. A path 106 may represent one or more components, which may include processing and/or termination components that convey an optical signal (or an optical signal and an electrical signal) between the processor 103 and the port 102. Conveying a signal may include the generation and conversion to optical, or the receiving and conversion to electrical.

Referring to FIG. 1 again, the optical transceiver module 110 of the present invention may be referred to as an active optical connector or active optical receptacle and active optical plug. In general, such active optical connectors may be configured to provide the physical connection interface to a mating connector and an optical assembly. The optical transceiver module 110 may be a light engine configured to generate and/or process the optical signals. The optical transceiver module 110 can provide conversion from an electrical-to-optical signal or from an optical-to-electrical signal.

In one embodiment, the optical transceiver module 110 may be configured to process the optical signals consistent with or in accordance with one or more communication protocols. For embodiments in which the optical transceiver module 110 is configured to convey an optical signal and an electrical signal, it is not strictly necessary for the optical and electrical interfaces to operate according to the same protocol, but they may. Whether the optical transceiver module 110 processes signals are in accordance with the protocol of the electrical I/O interface, or in accordance with a different protocol or standard, the optical transceiver module 110 may be configured or programmed for an intended protocol within a particular connector, and different light engines may be configured for different protocols.

FIGS. 2 to 5 are schematic diagrams showing the optical transceiver module according to one embodiment of the present invention. The optical transceiver module 110 can comprise a substrate 111, a processor 112, a plurality of hermetic transmitting devices 113, at least one optical receiving device 114, a coupler 115 and a module housing 116. The substrate 111 has a first surface 111a and a second surface 111b opposite to the first surface 111a. The substrate 111 may be a printed circuit board (PCB) or a ceramic substrate which includes mechanisms, such as pins or connection balls, for interfacing the system to an external device. The processor 112 is connected to the substrate 111, and the processor 112 is intended to show any type of processor die, and is not limited to any particular processor type. The hermetic transmitting devices 113 and the at least one optical receiving device 114 are electrically connected to the processor 112 on the substrate 111, such as through traces processed into the package substrate 111, for transmitting and receiving optical signals. The hermetic transmitting devices 113 and the at least one optical receiving device 114 include transmit and receive circuits that transfer electrical signals, and more specifically process the timing or other protocol aspects of electrical signals corresponding to an optical signal.

In this embodiment, the optical transceiver module 110 may be applied to a parallel-single-mode-4-lane (PSM4) technology, wherein the plurality of hermetic transmitting devices 113 can introduce light of different wavelengths to one single-mode optical fiber via wavelength-division multiplexer respectively; for middle distance and long distance transmission in the single-mode optical fiber, and the optical receiving device 114 can receive the optical signal, and the received optical signal is performed to a light-split process by the de-multiplexer, and the split optical signals are introduced to different channels. In varied embodiments, except PSM4 technology, the optical transceiver also can be applied to related optical communication technologies, such as wavelength-division multiplexing (WDM), binary phase shift keying modulation (BPSK), quadrature phase shift keying modulation (QPSK), conventional/coarse wavelength division multiplexing (CWDM), dense wavelength division multiplexing (DWDM), optical add/drop multiplexer (OADM), and reconfigurable optical add/drop multiplexer (ROADM).

Referring to FIGS. 2 to 5 again, the coupler 115 cam provide a redirection mechanism to exchange light between the optical transceiver module 110 and something external to this system (e.g., another device) over optical fibers (not shown). For example, the coupler 115 can provide a redirection of optical signals via a reflection surface. The angle and general dimensions and shape of the coupler 115 are dependent on the wavelength of optical light rays, as well as the material used to make the coupler and the overall system requirements. In one embodiment, the coupler 115 is designed to provide redirection of vertical light from the substrate 111 and of horizontal light to the substrate 111.

Various communication protocols or standards may be used for embodiments described herein. Communication protocols may include, but are not limited to, mini DisplayPort, standard DisplayPort, mini universal serial bus (USB), standard USB, PCI express (PCIe), or high-definition multimedia interface (HDMI). It will be understood that each different standard may include a different configuration or pinout for the electrical contact assembly. Additionally, the size, shape and configuration of the coupler or connector may be dependent on the standard, including tolerances for the mating of the corresponding connectors. Thus, the layout of the coupler or connector to integrate the optical I/O assembly may be different for the various standards. As will be understood by those of skill in the art, optical interfaces require line-of-sight connections to have an optical signal transmitter interface with a receiver (both may be referred to as lenses). Thus, the configuration of the coupler or connector will be such that the lenses are not obstructed by the corresponding electrical contact assemblies if present. For example, optical interface lenses can be positioned to the sides of the contact assemblies, or above or below, depending on where space is available within the coupler or connector.

In this embodiment, the coupler 115 may use a Multi-Fibre Push On (MPO) standard, wherein the optical fibers can have multi-channels by one-by-one connecting. In one embodiment, an LR4 standard requirement can be achieved by using a CWDM/WDM system for multiplexing or de-multiplexing.

Referring to FIG. 2 again, the module housing 116 is configured to protect and package (or assemble) the processor 112, the plurality of hermetic transmitting devices 113, the at least one optical receiving device 114 and the coupler 115. In other embodiments, the optical transceiver module 110 may further comprise a planar light-wave chip (PLC). The planar light-wave chip (PLC) can provide a plane for the transfer of light and its conversion to electrical signals, and vice versa. It should be understood that the planar light-wave chip (PLC) can be integrated into the coupler 115.

Figure 5:
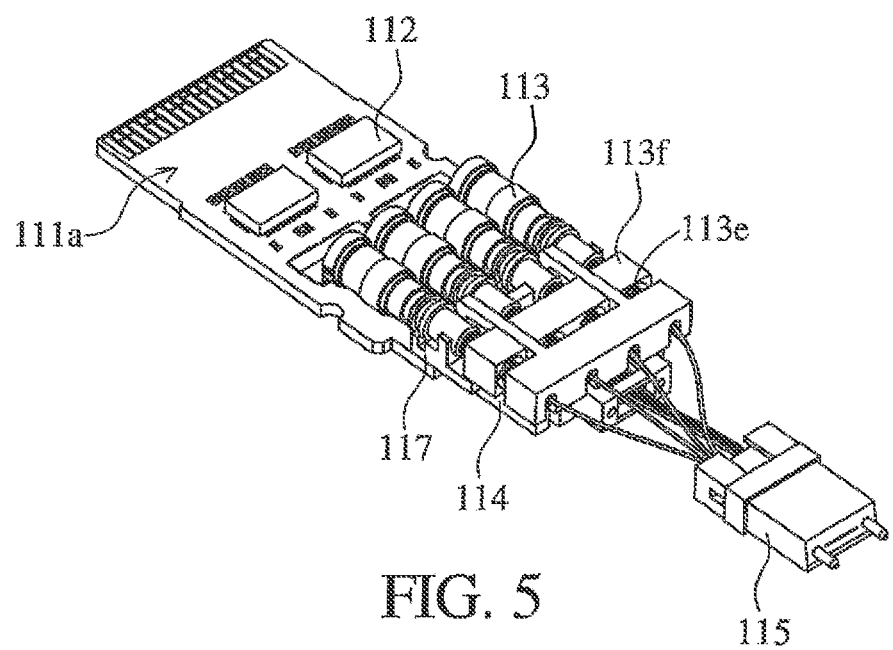
Figure 6:
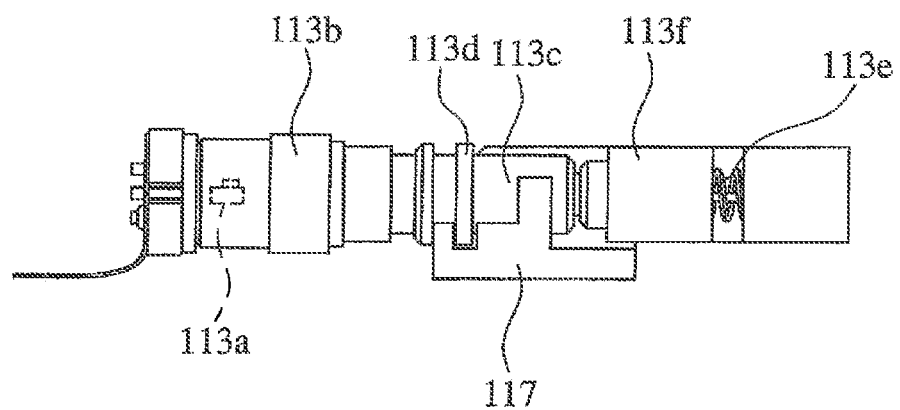
FIG. 6 is a schematic diagram showing the transmitting devices and a positioning holder according to one embodiment of the present invention.
Figure 7:
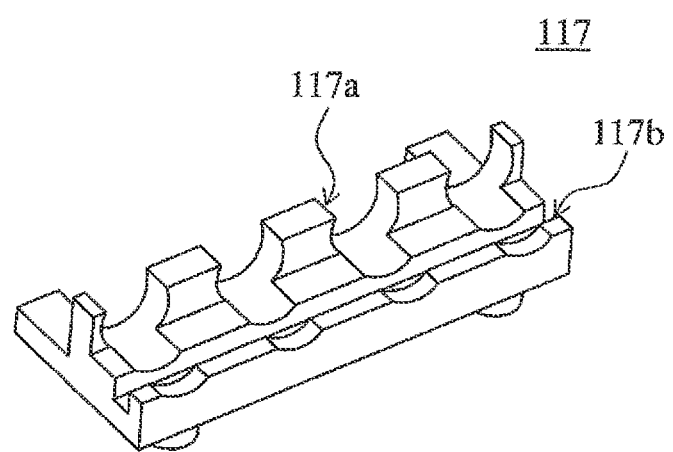
FIG. 7 is a schematic diagram showing the positioning holder according to one embodiment of the present invention.

Referring to FIGS. 5 to 7, FIG. 6 is a schematic diagram showing the transmitting devices and a positioning holder according to one embodiment of the present invention, and FIG. 7 is a schematic diagram showing the positioning holder according to one embodiment of the present invention. In this embodiment, the plurality of hermetic transmitting devices 113 can be arranged on the first surface 111a of the substrate 111. For example, 4 or more than 4 hermetic transmitting devices 113 can arranged on the first surface 111a in parallel. In one embodiment, the optical transceiver module 110 can further comprise a positioning holder 117 configured to position and hold the plurality of hermetic transmitting devices 113 on the first surface 111a of the substrate 111, so as to secure the connections between the fibers and the transceiver devices (transmitter/receiver), thereby enhancing the reliability of the optical transceiver module 110. More specifically, the positioning holder 117 can be disposed on the first surface 111a of the substrate 111, and the positioning holder 117 can include a plurality of recesses 117a and at least one groove 117b. The plurality of recesses 117a are configured to correspondingly receive and position the plurality of hermetic transmitting devices 113, and the groove 117b is configured to engage the hermetic transmitting devices 113 on the positioning holder 117.

Referring to FIG. 6 again, each of the hermetic transmitting devices 113 comprises an optical transmitter 113a, and the optical transmitter 113a is completely sealed and packaged in one or more than one hermetic housing 113b. That is, the optical transmitter 113a sealed in the hermetic transmitting devices 113 will not be exposed to the outside environment or air, thereby preventing the optical transmitter 113a from degradation, as well as enhancing a performance and a life time of the optical transmitter 113a. In embodiments of the present invention, an airtightness of the hermetic transmitting devices 113 at least satisfies the requirement of the airtightness of an industrial transmitter optical sub-assembly (TOSA). In varied embodiments, the airtightness of each of the hermetic transmitting devices 113 may be in the range of $1\times10^{-12}$ to $5*10^{-1}$ (atm*cc/sec). In some embodiments, more specifically, the airtightness of the hermetic transmitting devices 113 may be in the range of $1\times10^{-9}$ to $5*10^{-8}$ (atm*cc/sec).

In various embodiments, a wavelength of at least one optical signal transmitted from the optical transmitter 113a of the hermetic transmitting devices 113 is within the range of the near-infrared light spectrum or the infrared light spectrum. That is, the wavelength of the at least one optical signal transmitted from the optical transmitter 113a is in the range of 830 nm to 1660 nm. The optical transmitter 113a can be any type of laser chip suitable for producing optical signals, such as an edge-emitting device (such as FD/DFB/EML) or a vertical-cavity surface-emitting laser (VCSEL).

Referring to FIGS. 6 and 7 again, in various embodiments, each of the hermetic transmitting devices 113 may further include one or more than one hermetic housing 113b and a cylindrical element 113c. The optical transmitter 113a can be sealed and packaged within the hermetic housing 113b without any gap or slit, so as to enhance the airtightness of the hermetic transmitting devices 113. In some embodiments, the hermetic housing 113b may be a cylindrical housing. The cylindrical elements 113c of the hermetic transmitting devices 113 are disposed at one side of hermetic housing 113b and partially received in the recesses 117a of the positioning holder 117, and the optical signals emitted from the optical transmitters 113a can be transmitted to the fibers through the cylindrical elements 113c. At least one outer ring part 113d is formed on the outer surface of the cylindrical elements 113c for engaging the groove 117b of the positioning holder 117. A coupling lens (not shown) can be disposed in the cylindrical elements 113c and can include a convex lens or spherical lens, so as to couple the optical signal emitted from the optical transmitters 113a to the external optical fiber via the cylindrical elements 113c.

In one embodiment, as shown in FIGS. 5 and 6, the hermetic transmitting devices 113 can further comprise at least one fiber position spring 113e and a spring holder 113f. The at least one fiber position spring 113c is disposed at one side of the cylindrical elements 113c and secured in the spring holder 113f. The external optical fiber can be inserted through the fiber position spring 113e for being connected to the cylindrical elements 113e. In this manner, external optical fiber can be securely connected to the cylindrical elements 113c by the fiber position spring 113e, thereby securing the connections between the fibers and the transceiver devices (transmitter/receiver), as well as enhancing the reliability of the optical transceiver module 110. More specifically, one part of the spring holder 113f close to the fiber is movable and connect to fiber position spring 113e. By use of the elastic force of the fiber position spring 113e, the spring holder 113f can hold one end of the optical fiber to contact the cylindrical elements 113c, thereby securing the connection and position between the optical fibers and the transceiver devices.

In this embodiment, at least one protruded portion of the cylindrical elements 113c can protrude beyond or exceed one end or one side of the substrate 111, and the at least one optical receiving device 114 can be positioned or mounted at one side of the protruded portion of the cylindrical elements 113c, such as mounted at the bottom of the protruded portion of the cylindrical elements 113c. In this case, at least one portion of the positioning holder 117 can protrude beyond or exceed one end or one side of the substrate 111, so as to securely hold the protruded portion of the cylindrical elements 113c. More specifically, the at least one optical receiving device 114 may be non-hermetic and mounted below the protruded portion of the cylindrical elements 113c and the spring holder 113f by a chip-on-board manner, in this case, the hermetic transmitting devices 113 can be arranged on the first surface 111a of the substrate 111, and the at least one optical receiving device 114 can be mounted below the cylindrical elements 113e, without being mounted on the first surface 111a of the substrate 111. Therefore, the size or width of the substrate 111 of the optical transceiver module 110 can be reduced. That is, the size of the optical transceiver module 110 can be reduced. Furthermore, the optical receiving device 114 can be directly mounted on the protruded portion of the cylindrical elements 113c, without being mounted on the second surface 111b of the substrate 111. Therefore, the thickness or size of the optical transceiver module 110 can be further reduced. In this embodiment, a flexible printed circuit (FPC) board 118 is connected between the optical receiving device 114 and a circuit of the substrate 111, and the optical receiving device 114 can be electrically connected to the circuit of the substrate 111 through the FPC board 118. Thus, the optical receiving device 114 can be electrically connected to the processor 112 on the substrate 111.

However, the optical receiving device 114 is not limited to the above description. In one embodiment, the at least one optical receiving device 114 may be hermetic type receiver. In another embodiment, the at least one optical receiving device 114 may be mounted on the second surface 111b of the substrate 111 by the chip-on-board manner.

In varied embodiments, the size of each of the plurality of hermetic transmitting devices 113 can satisfy a design requirement of QSFP28, QSFP+, or Micro QSFP+. For example, in one embodiment, the width of the substrate 111 may be in the range of 11 mm to 18 mm. Moreover, in another embodiment, the width of the substrate 111 may be in the range of 11.5 mm to 17 mm. For example, in one embodiment, the length of the substrate 111 may be in the range of 58 mm to 73 mm. Moreover, in another embodiment, the length of the substrate 111 may be in the range of 63 mm to 73 mm. In this manner, the size of each of the plurality of hermetic transmitting devices 113 can satisfy the requirement of QSFP28, QSFP+, or Micro QSFP+. Therefore, by arranging the hermetic transmitting devices 113 and the at least one optical receiving device 114, the plurality of hermetic transmitting devices 113 and the at least one optical receiving device 114 can be assembled packaged within a small optical transceiver module 110 for down-sizing the optical transceiver.

For example, in one embodiment, the width of the module housing 116 may be in the range of 13 mm to 20 mm. Moreover, in another embodiment, the width of the module housing 116 may be in the range of 13.5 mm to 19 mm. For example, in one embodiment, the length of the module housing 116 may be in the range of 60 mm to 75 mm. Moreover, in another embodiment, the length of the module housing 116 may be in the range of 65 mm to 75 mm. In this manner, the optical transceiver module of the present invention can be down-sized.

Figure 8A:
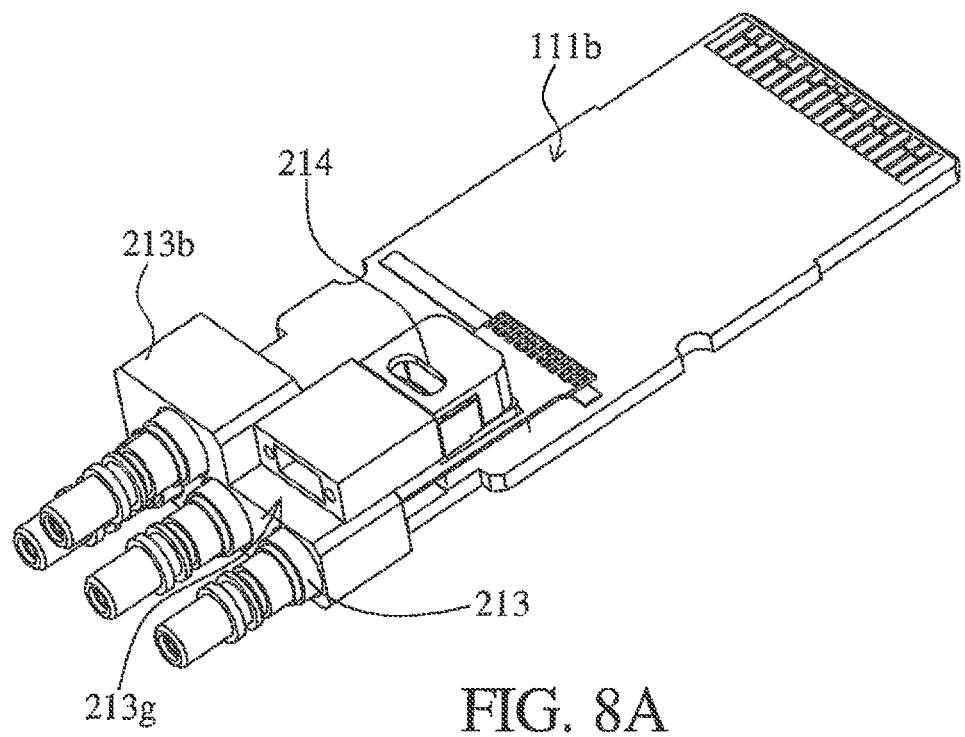
FIGS. 8A and 8B are schematic diagrams showing the optical transceiver module according to one embodiment of the present invention.
Figure 8B:
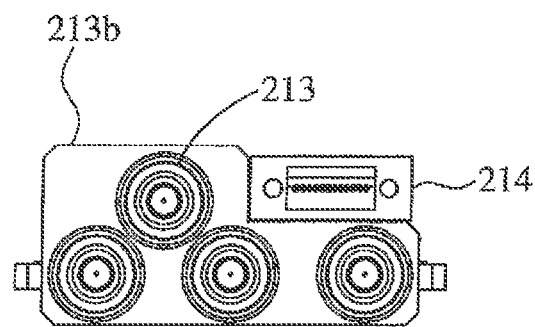

FIGS. 8A and 8B are schematic diagrams showing the optical transceiver module according to one embodiment of the present invention. In one embodiment, the plurality of optical transmitters 113a of the plurality of hermetic transmitting devices 213 can be packaged and assembled in one single hermetic housing 213b. In this embodiment, the single hermetic housing 213h can be an L-shaped housing with a recess 213g, and the optical fiber can pass through the recess 213g to be connected to the optical receiving device 214. More specifically, in this embodiment, the hermetic transmitting devices 213 can be disposed at one end of the substrate 111, and at least one portion of the optical receiving device 214 can be received in the recess 213g of the L-shaped housing 213b. In this manner, the plurality of hermetic transmitting devices 213 and the at least one optical receiving device 214 can be assembled packaged within a small optical transceiver module 110 for downsizing the optical transceiver.

In some embodiments, the plurality of hermetic transmitting devices may have an L-shaped arrangement, and the optical fiber can pass through the L-shaped arrangement of the plurality of hermetic transmitting devices to be connected to the optical receiving device 214.

Figure 9:
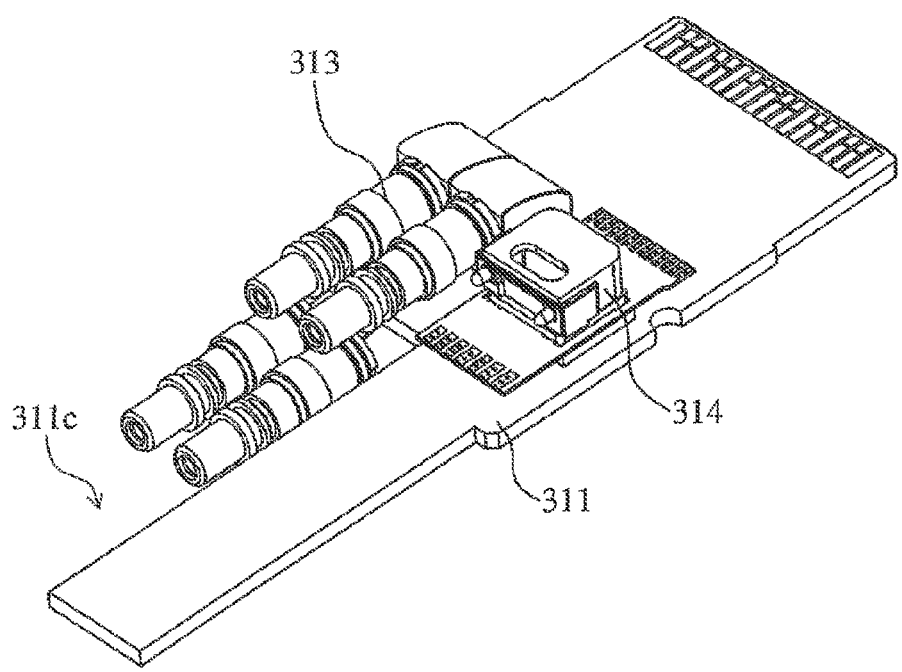
FIG. 9 is a schematic diagram showing the optical transceiver module according to one embodiment of the present invention.

FIG. 9 is a schematic diagram showing the optical transceiver module according to one embodiment of the present invention. In one embodiment, the substrate 311 can have a substrate recess 311c, thereby being L-shaped. In this embodiment, at least one of the hermetic transmitting devices 313 can be disposed and positioned in the substrate recess 311c of the substrate 311, and electrically connected to a circuit on the second surface 111b of the substrate 311 for being electrically connected to the processor 112. More specifically, in this embodiment, at least one of the hermetic transmitting devices 313, such as two of the hermetic transmitting devices 313, can be disposed and positioned in the substrate recess 311c, and the other hermetic transmitting devices 313, such as two of the hermetic transmitting devices 313, can be disposed on the first surface 111a of the substrate 311, and the optical receiving device 314 can be disposed on the first surface 111a of the substrate 311 and positioned at one side of the substrate recess 311c. In this manner, the plurality of hermetic transmitting devices 313 and the at least one optical receiving device 314 can be assembled packaged within a small optical transceiver module 110 for down-sizing the optical transceiver.

Figure 10:
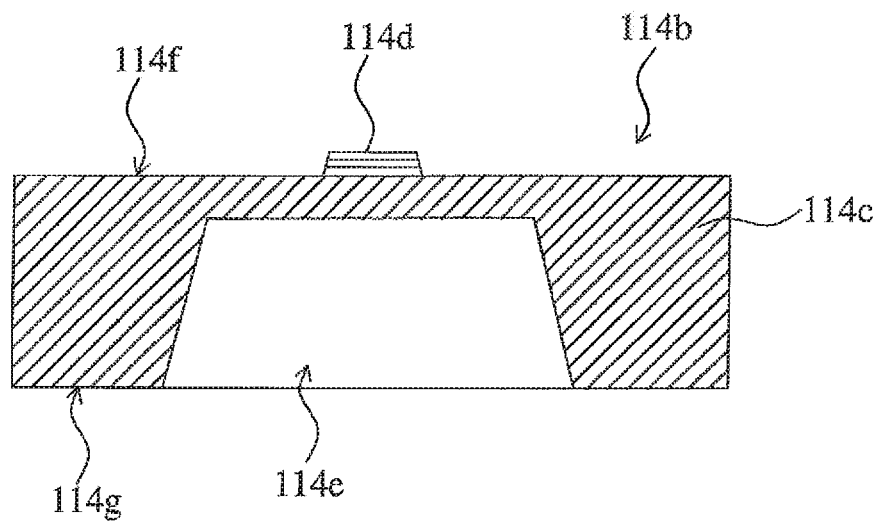
FIGS. 10 to 12 are schematic diagrams showing an optical receiving chip according to one embodiment of the present invention.
Figure 11:
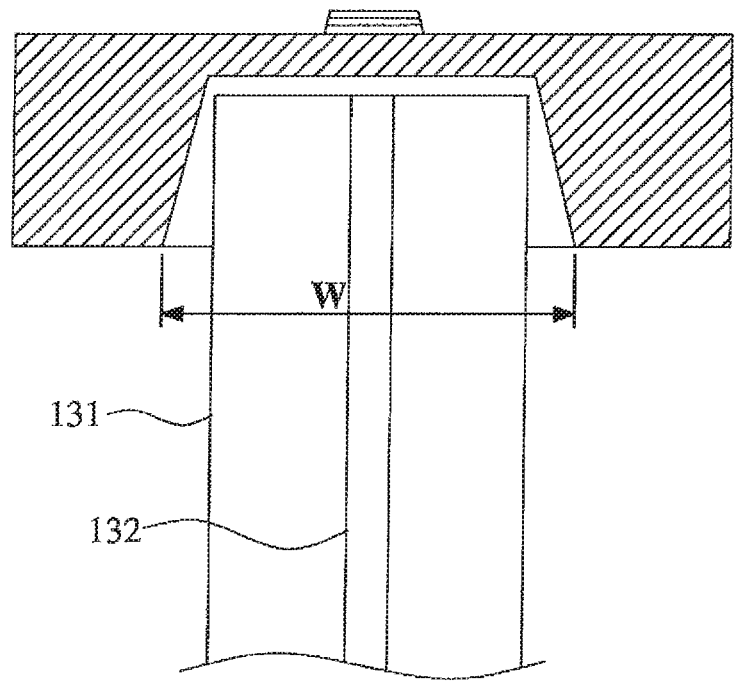
Figure 12:
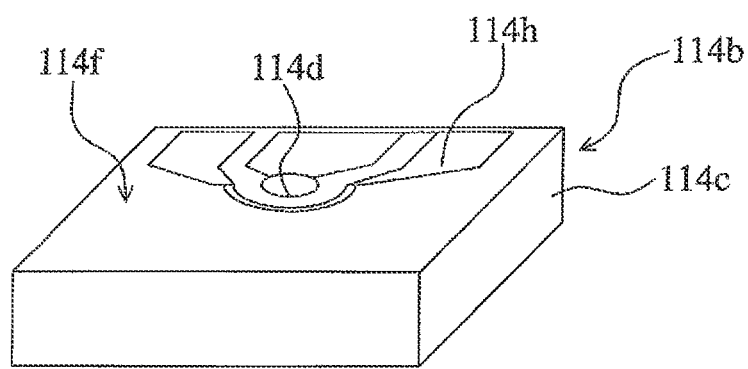

FIGS. 10 to 12 are schematic diagrams showing an optical receiving chip according to one embodiment of the present invention. In varied embodiments, the optical receiving device 114 can include a receiver housing (not shown) and the optical receiving chip 114b, and the optical receiving chip 114b is disposed in the receiver housing. The optical receiving chip 114b can include a chip substrate 114c, an optical receiver (or photo-detector) 114d and at least one position hole 114e. The chip substrate 114c has a first substrate surface 114f and a second substrate surface 114g, and the optical receiver 114d can be disposed on the first substrate surface 114f of the chip substrate 114c, and a circuit 114h can be formed on the first substrate surface 114f to be connected to the optical receiver 114d. The at least one position hole 114e can be formed on the second substrate surface 114g of the chip substrate 114c, and further positioned to the optical receiver 114d on the first substrate surface 114f. That is, at least portion of the position hole 114e can overlap the optical receiver 114d on the first substrate surface 114f. In varied embodiments, the largest diameter (or width) W of the position hole 114e can be larger than a diameter of one end of the external optical fiber 131, and thus a signal output end of the external optical fiber 131 can be inserted into and received in the position hole 114e. In this manner, by inserting the signal output end of the external optical fiber 131 into the position hole 114e on the second substrate surface 114g, a fiber core 132 of the optical fiber 131 can be directly secured positioned to the optical receiver 114d on the first substrate surface 114f, and thus the optical signal emitted from the fiber core 132 of the optical fiber 131 can be directly transmitted to the optical receiver 114d through the chip substrate 114c.

In varied embodiments, a distance between a bottom surface within the position hole 114e and the optical receiver 114d on the first substrate surface 114f can be in a range of 40 µm to 90 µm.

Figure 13:
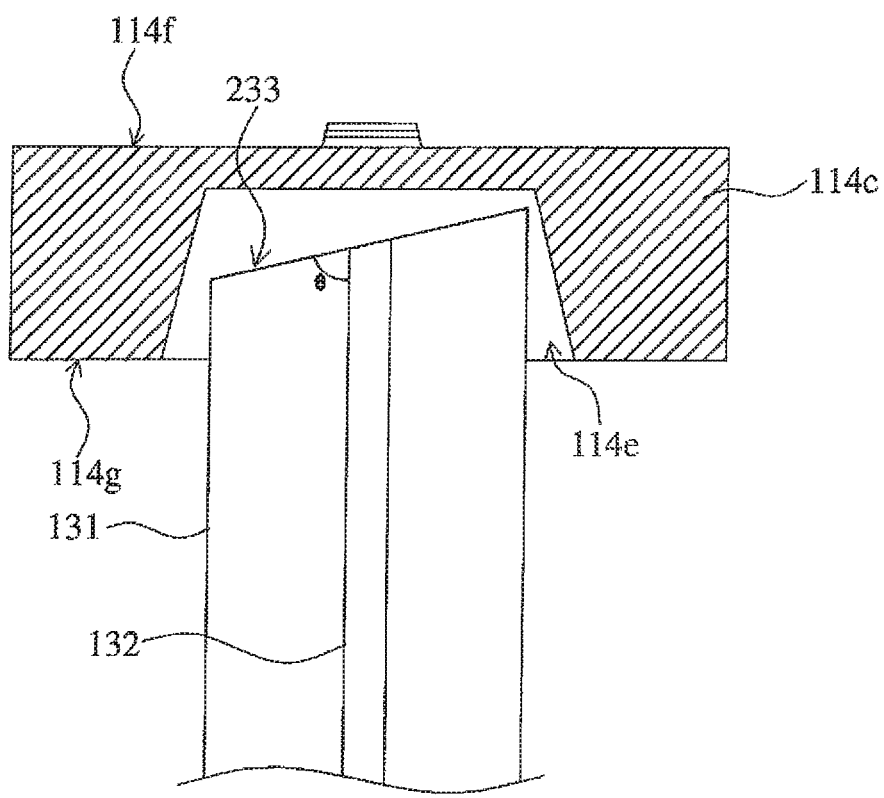
FIG. 13 is a schematic diagram showing the optical receiving chip according to one embodiment of the present invention.

FIG. 13 is a schematic diagram showing the optical receiving chip according to one embodiment of the present invention. In one embodiment, an angle θ between an end surface 233 of the signal output end of the optical fiber 131 and an axis direction of the fiber core 132 can be less than 90 degrees, so as to reduce the undesired light reflection when emitting optical signals to the optical receiver 114d on the first substrate surface 114f. That is the angle θ between the end surface 233 of the signal output end of the optical fiber 131 and a direction of the optical signals emitted from the fiber core 132 can be less than 90 degrees for reducing the undesired light reflection. In this case, the angle θ may be in a range of 80 agrees to 85 agrees.

Figure 14:
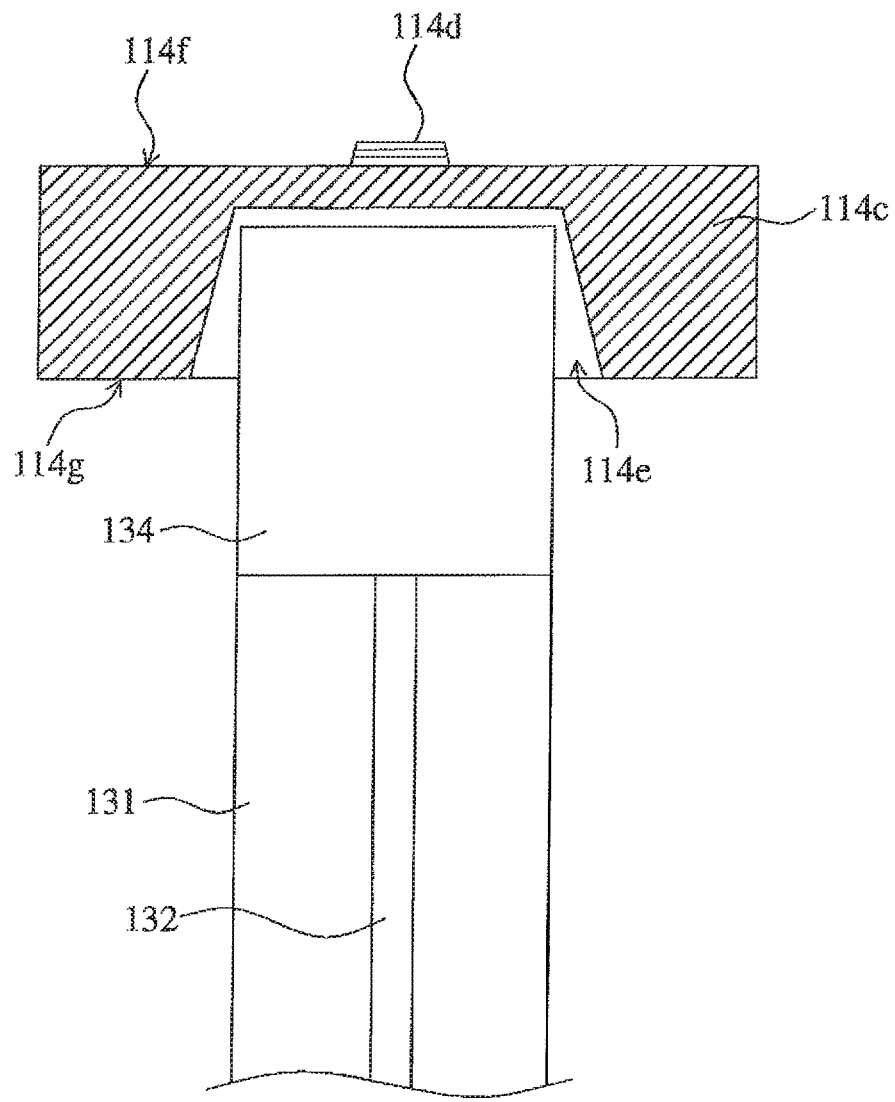
FIG. 14 is a schematic diagram showing the optical receiving chip according to one embodiment of the present invention.

FIG. 14 is a schematic diagram showing optical receiving chip according to one embodiment of the present invention. In one embodiment, a lens component 134 can be disposed at the signal output end of the optical fiber 131 for improving the output efficiency of the outputted signals from the optical fiber 131. For example, when the signal output end of the optical fiber 131 is inserted and received in the position hole 114e, the optical signals emitted from the optical fiber 131 can be focused on the optical receiver 114d on the first substrate surface 114f, thereby improving the output efficiency of the outputted signals from the optical fiber 131.

In one embodiment, the lens component 134 disposed at the signal output end of the optical fiber may be a convexoplane lens or a graded-index (GRIN) lens for focusing the optical signals emitted from the optical fiber onto the optical receiver 114d.

Figure 15:
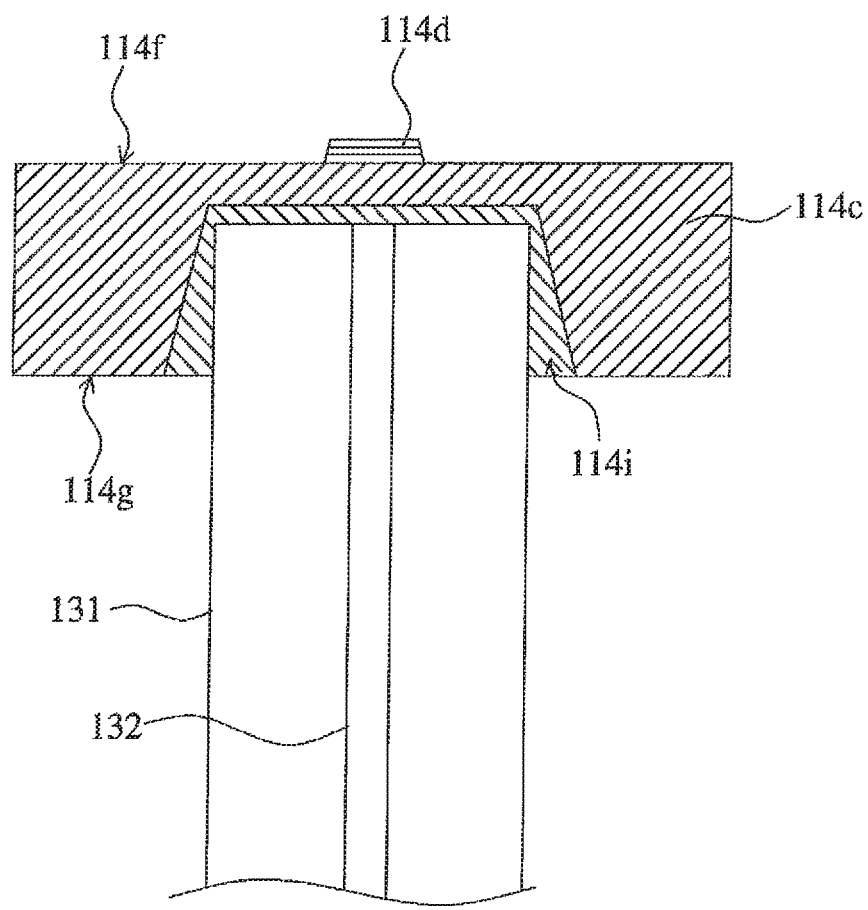
FIG. 15 is a schematic diagram showing the optical receiving chip according to one embodiment of the present invention.

FIG. 15 is a schematic diagram showing the optical receiving chip according to one embodiment of the present invention. In one embodiment, the optical receiving chip 114b can further include an optical adhesive 114i filled between the optical fiber 131 and the position hole 114e for securing the optical fiber 131 in the position hole 114e. In this case, a refractive index of the optical adhesive 114i can match a refractive index of the chip substrate 114c and a refractive index of the optical fiber 131, so as to reduce the undesired light reflection or refraction when emitting optical signals to the optical receiver 114d. That is, the refractive index of the optical adhesive 114i can be in a range of the refractive index of the chip substrate 114c to the refractive index of the optical fiber 131, so as to reduce the undesired light reflection or refraction. For example, in one embodiment, the refractive index of the optical adhesive 114i can be in a range of 1.2 to 3.5, so as to reduce the undesired light reflection or refraction. In another one embodiment, the refractive index of the optical adhesive 114i can be in a range of 1.5 to 3.3, so as to reduce the undesired light reflection or refraction.

Figure 16:
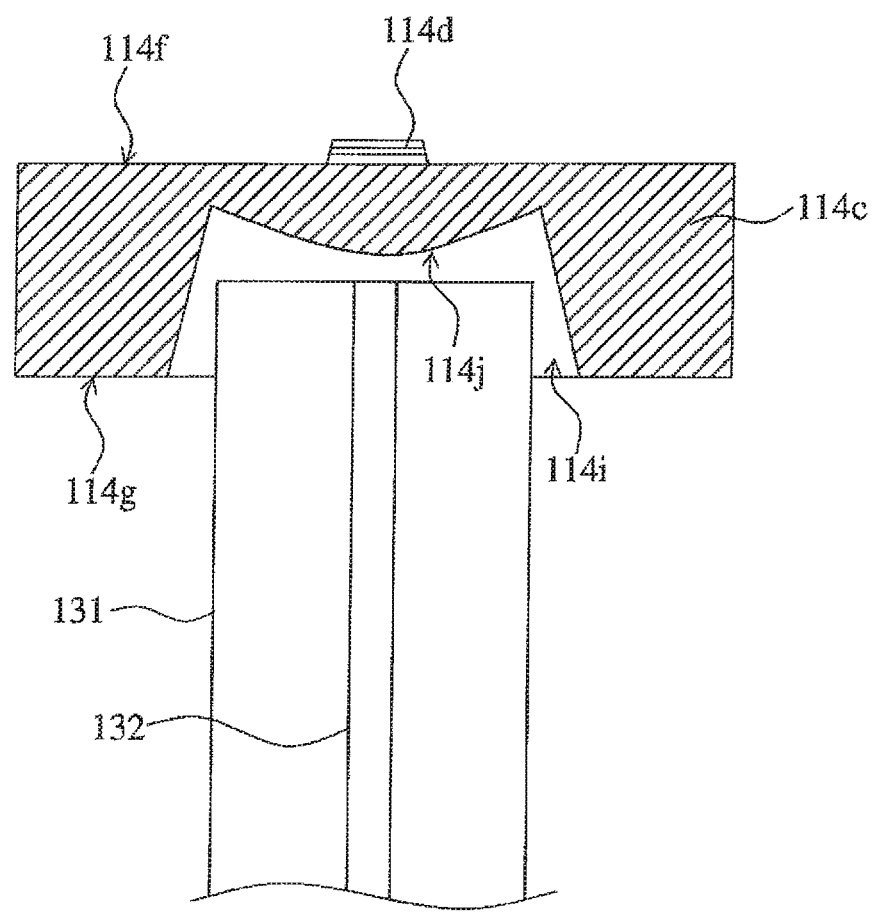
FIG. 16 is a schematic diagram showing the optical receiving chip according to one embodiment of the present invention.

FIG. 16 is a schematic diagram showing the optical receiving chip according to one embodiment of the present invention. In one embodiment, a convexity 114j can be formed on the bottom surface within the position hole 114e. The convexity 114j is positioned to the signal output end of the optical fiber 131 for acting as a concave lens, so as to focus the optical signals emitted from the optical fiber 131 onto the optical receiver 114d.

Figure 17:
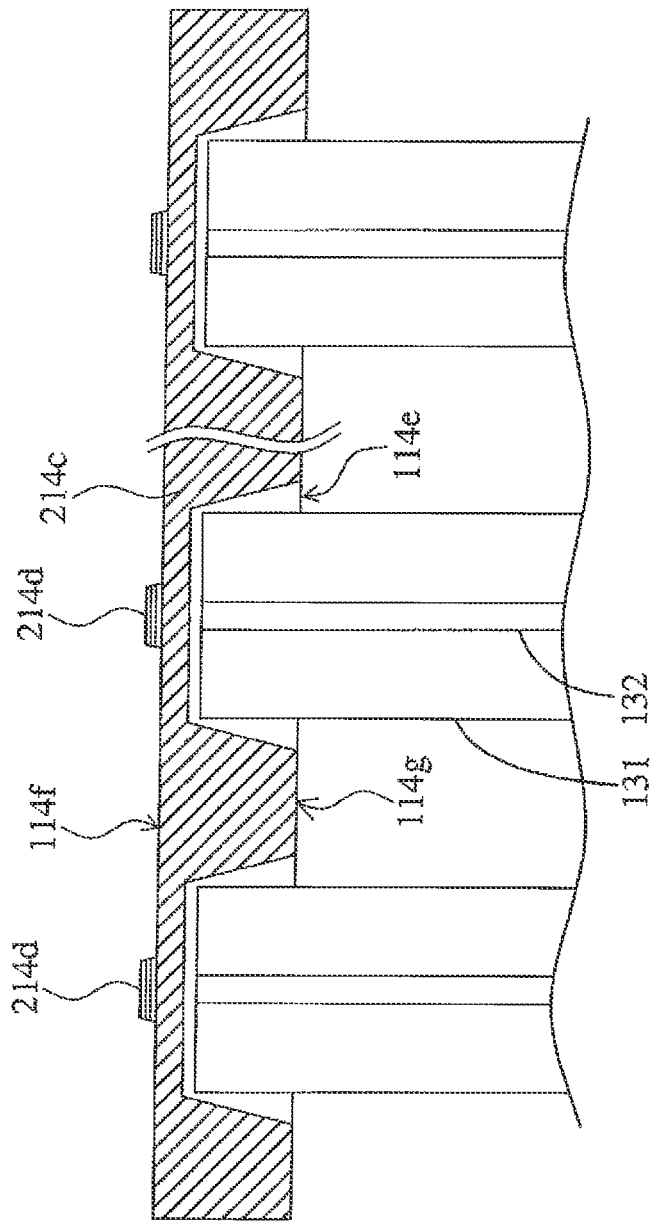
FIG. 17 is a schematic diagram showing the optical receiving chip according to one embodiment of the present invention.

FIG. 17 is a schematic diagram showing the optical receiving chip according to one embodiment of the present invention. In one embodiment, the optical receiving chip 214b can include a chip substrate 214e, a plurality of optical receivers (or photo-detectors) 214d and a plurality of position holes 214e. The plurality of optical receivers 214d are disposed on the first substrate surface 114f of the chip substrate 214c, thereby forming an array of the plurality of optical receivers 214d. The plurality of position holes 214e are formed on the second substrate surface 114g of the chip substrate 214c, and further positioned to the optical receivers 214d on the first substrate surface 114f of the chip substrate 214c, respectively. The signal output ends of the plurality of external optical fibers 131 can be inserted into and received in the position holes 214e, respectively. In this manner, by inserting the signal output ends of the external optical fibers 131 into the position holes 214e on the second substrate surface 114g, fiber cores 132 of the optical fibers 131 can be directly secured and positioned to the optical receivers 214d on the first substrate surface 114f of the chip substrate 214c, respectively.

As described above, the plurality of hermetic transmitting devices and the at least one optical receiving device can be assembled packaged within a small optical transceiver module for down-sizing the optical transceiver.

In addition, with the position hole of the optical receiving chip, the optical fiber can be directly secured positioned to the optical receiver on the first substrate surface, and thus the optical signal emitted from the fiber core of the optical fiber can be directly transmitted to the optical receiver through the chip substrate.

Various aspects of the illustrative implementations are described herein using terms commonly employed by those skilled in the art to convey the substance of their work to others skilled in the art. It will be apparent to those skilled in the art, however, that embodiments of the present invention may be practiced with only some of the described aspects. For purposes of explanation, specific numbers, materials and configurations are set forth in order to provide a thorough understanding of the illustrative implementations. It will be apparent to one skilled in the art, however, that embodiments of the present invention may be practiced without the specific details. In other instances, well-known features are omitted or simplified in order not to obscure the illustrative implementations.

Flow diagrams illustrated herein provide examples of sequences of various process actions which may be performed by processing logic that may include hardware, software, or a combination thereof. Furthermore, various operations are described as multiple discrete operations, in turn, in a manner that is most helpful in understanding the illustrative embodiments; however, the order of description should not be construed as to imply that these operations are necessarily order dependent. Thus, the illustrated implementations should be understood only as examples, and the processes can be performed in a different order, and some actions may be performed in parallel, unless otherwise specified.

Moreover, methods within the scope of this disclosure may include more or fewer steps than those described.

The phrases "in some embodiments" and "in various embodiments" are used repeatedly. These phrases generally do not refer to the same embodiments; however, they may. The terms "comprising", "having", and "including" are synonymous, unless the context dictates otherwise.

Although various example methods, apparatuses, and systems have been described herein, the scope of coverage of the present disclosure is not limited thereto. On the contrary, the present disclosure covers all methods, apparatus, systems, and articles of manufacture fairly falling within the scope of the appended claims, which are to be construed in accordance with established doctrines of claim interpretation. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

The present invention has been described with preferred embodiments thereof, and it is understood that many changes and modifications to the described embodiments can be carried out without departing from the scope and the spirit of the invention that is intended to be limited only by the appended claims.

What is claimed is:

1. An optical transceiver module, comprising:
    a substrate having a first surface and a second surface opposite thereto;
    at least one optical receiving device connected to the substrate; and
    a plurality of hermetic transmitting devices disposed on the substrate, wherein each of the hermetic transmitting devices includes an optical transmitter, and the optical transmitters of the hermetic transmitting devices are completely sealed in one or more than one hermetic housing;
    wherein a width of the substrate is in a range of 11 mm to 18 mm.

2. The optical transceiver module according to claim 1, wherein 4 or more than 4 hermetic transmitting devices are arranged on the first surface such that a plurality of hermetic housings of the optical transmitters of the hermetic transmitting devices extends in mutually parallel direction.

3. The optical transceiver module according to claim 1, wherein the optical transceiver module further comprises a positioning holder configured to position the plurality of hermetic transmitting devices on the first surface of the substrate.

4. The optical transceiver module according to claim 3, wherein the positioning holder is disposed on the first surface of the substrate, and the positioning holder includes a plurality of recesses and at least one groove, and the plurality of recesses are configured to correspondingly receive and position the plurality of hermetic transmitting devices, and the groove is configured to engage the hermetic transmitting devices on the positioning holder.

5. The optical transceiver module according to claim 4, wherein each of the hermetic transmitting devices further includes one or more than one hermetic housing and a cylindrical element, and the cylindrical elements of the hermetic transmitting devices are disposed at one side of hermetic housing and partially received in the recesses of the positioning holder, and at least one outer ring part is formed on an outer surface of the cylindrical elements for engaging the groove of the positioning holder.

6. The optical transceiver module according to claim 5, wherein the hermetic transmitting devices further comprise at least one fiber position spring and a spring holder, and the at least one fiber position spring is disposed at one side of the cylindrical elements and secured in the spring holder, and optical fibers are inserted through the fiber position spring for being connected to the cylindrical elements.

7. The optical transceiver module according to claim 6, wherein the at least one optical receiving device is mounted below the spring holder.

8. The optical transceiver module according to claim 7, wherein a flexible printed circuit (FPC) board is connected between the optical receiving device and a circuit of the substrate.

9. The optical transceiver module according to claim 6, wherein one part of the spring holder close to the optical fibers is movable and connect to the fiber position spring.

10. The optical transceiver module according to claim 5, wherein protruded portions of the cylindrical elements protrude beyond one end or one side of the substrate, and the at least one optical receiving device is mounted to the bottom of the protruded portions of the cylindrical elements.

11. The optical transceiver module according to claim 1, wherein an air-tightness of each of the hermetic transmitting devices is in the range of $1\times10^{-12}$ to $5*10^{-7}$ atm*cc/sec.

12. The optical transceiver module according to claim 11, wherein the air-tightness of each of the hermetic transmitting devices is in the range of $1\times10^{-9}$ to $5*10^{-8}$ atm*cc/sec.

13. The optical transceiver module according to claim 1, wherein a size of each of the plurality of hermetic transmitting devices satisfies, a design requirement of QSFP28, QSFP+, or Micro QSFP+.

14. The optical transceiver module according to claim 1, wherein a plurality of optical transmitters of the plurality of hermetic transmitting, devices is packaged and assembled in a single hermetic housing.

15. The optical transceiver module according to claim 14, wherein the single hermetic housing is an L-shaped housing with a recess, and optical fiber pass through the recess to be connected to the optical receiving device.

16. The optical transceiver module according to claim 1, wherein the substrate has a substrate recess and is L-shaped, and two of the hermetic transmitting devices are disposed in the substrate recess, and two of the hermetic transmitting devices are disposed on the first surface of the substrate, and the optical receiving device is disposed on the first surface of the substrate and positioned at one side of the substrate recess.

17. An optical cable module, comprising:
an optical cable; and
an optical transceiver module connected to the optical cable, wherein the optical transceiver module comprises:
a substrate having a first suffice and a second suffice opposite thereto;
at least one optical receiving device connected to the substrate; and
a plurality of hermetic transmitting devices disposed on the substrate, wherein each of the hermetic transmitting devices includes an optical transmitter, and the optical transmitters of the hermetic transmitting devices are completely sealed in one or more than one hermetic housing;
wherein a width of the substrate is in a range of 11 mm to 18 mm.

18. An optical transceiver module, comprising:
a substrate having a first surface and a second surface opposite thereto wherein a width of the substrate is in a range of 11 mm to 18 mm, and a length of the substrate is in a range of 58 mm to 73 mm:
at least one optical receiving device connected to the substrate; and
a plurality of hermetic transmitting devices disposed on the substrate, wherein each of the hermetic transmitting devices includes an optical transmitter, and the optical transmitters of the hermetic transmitting devices are completely sealed in one or more than one hermetic housing, and 4 or more than 4 hermetic transmitting devices are arranged on the first surface such that a plurality of hermetic housings of the optical transmitters of the hermetic transmitting devices extends in mutually parallel direction, and an air-tightness of each of the hermetic transmitting devices is in the range of $1\times10^{-12}$ to $5*10^{-7}$ atm*cc/sec;
wherein the optical transceiver module further comprises a positioning holder disposed on the first surface of the substrate configured to position the plurality of hermetic transmitting devices on the first surface, and the positioning holder includes a plurality of recesses and at least one groove, and the plurality of recesses are configured to correspondingly receive and position the plurality of hermetic transmitting devices, and the groove is configured to engage the hermetic transmitting devices on the positioning holder.

* * * * *